United States Patent [19]

Niskala

[11] 4,207,690

[45] Jun. 17, 1980

[54] SUCTION DEVICE FOR CLEANING BOTTOMS OF WATERWAYS AND FOR LIFTING SUNKEN TIMBER

[76] Inventor: Lauri O. Niskala, Markkinakatu 7, 96200 Rovaniemi, Finland, 20

[21] Appl. No.: 904,255

[22] Filed: May 9, 1978

[51] Int. Cl.² .............................................. E02F 3/92
[52] U.S. Cl. ........................................... 37/58; 37/63; 37/64; 37/183 R; 37/195
[58] Field of Search ............................ 37/58, 64–66, 37/72, 54, 195, 63, 183 R

[56] References Cited

U.S. PATENT DOCUMENTS

| 1,327,651 | 1/1920 | Beaven | 37/58 |
| 2,889,779 | 6/1959 | Hofer | 37/58 X |

FOREIGN PATENT DOCUMENTS

| 150015 | 8/1920 | United Kingdom | 37/58 |
| 1243615 | 8/1971 | United Kingdom | 37/58 |
| 242055 | 9/1969 | U.S.S.R. | 37/63 |

*Primary Examiner*—Clifford D. Crowder
*Attorney, Agent, or Firm*—Miller & Prestia

[57] ABSTRACT

A suction device for clearing the bottom of waterways includes a suction end having an inlet opening. Mounted to the horizontal edges of the inlet opening are either forcedriven conveyor screws or triangular flanges, with rollers mounted on the vertical edges of the inlet opening. The rollers in cooperation with either the triangular flanges or the conveyor screws turn material snagged in the waterway endwise into a suction pipe terminating at the suction end. Debris sucked into the suction pipe is delivered to a load basket at the other end of the suction pipe. The loading basket is constructed for lifting from the water by means such as a crane, and further constructed for unloading from the bottom thereof.

9 Claims, 10 Drawing Figures

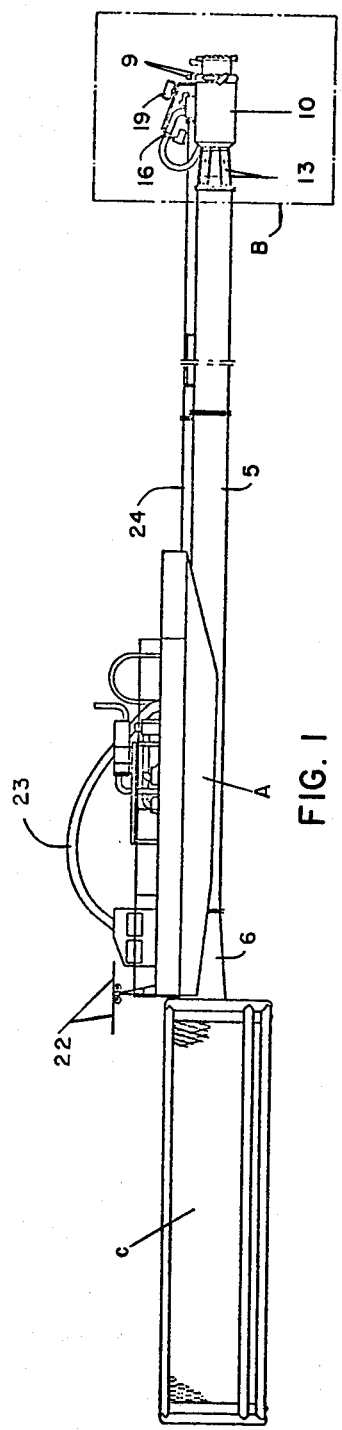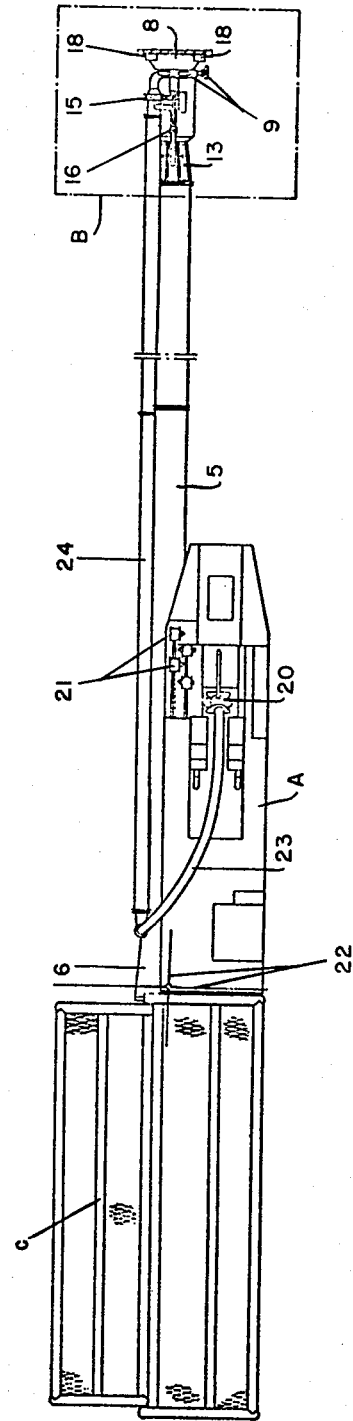

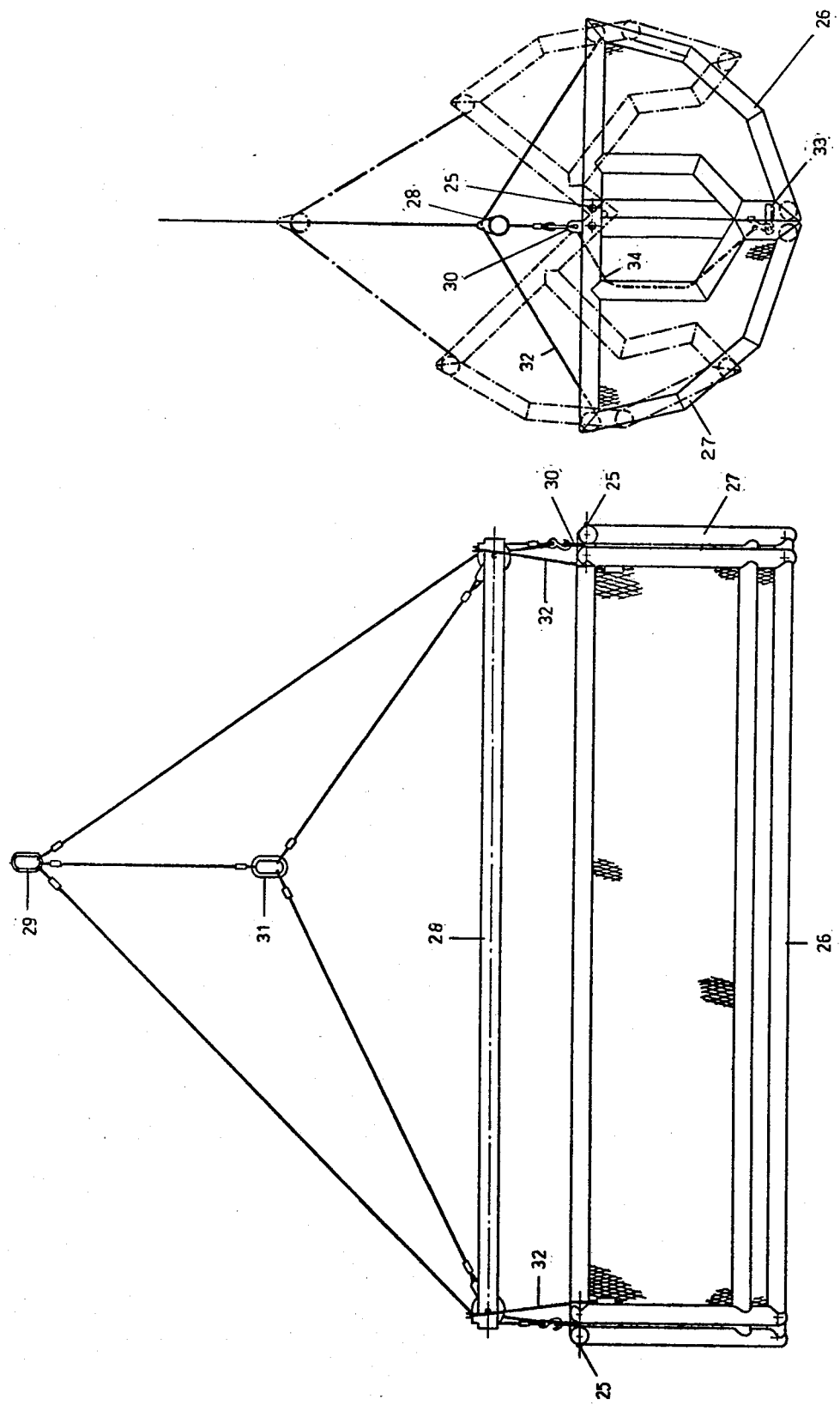

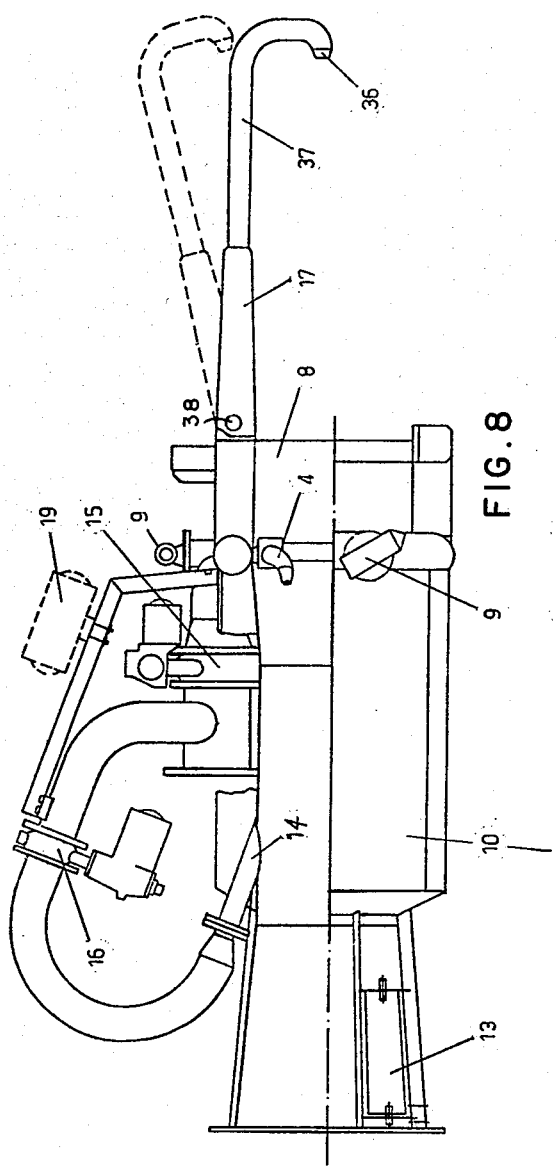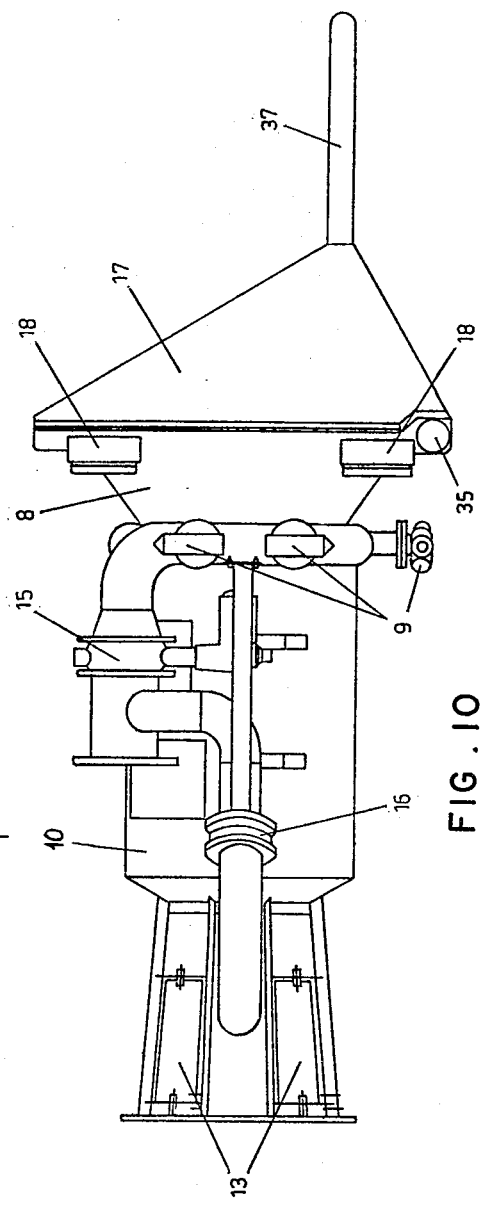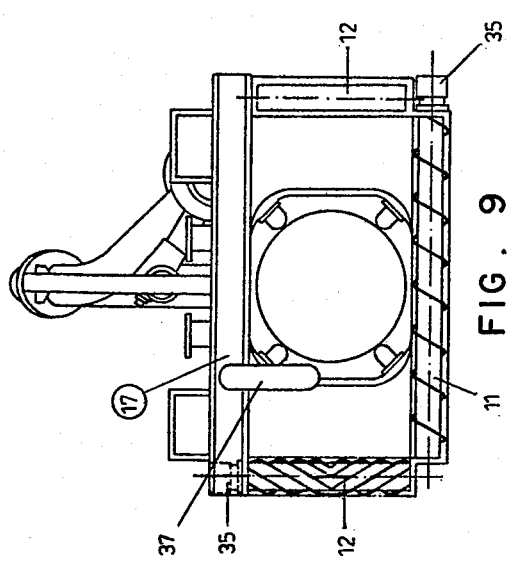

SUCTION DEVICE FOR CLEANING BOTTOMS OF WATERWAYS AND FOR LIFTING SUNKEN TIMBER

BACKGROUND OF THE INVENTION

On all waterways where timber is floated, some of the logs will sink down to the bottom as snags. In addition to this, bark and other rubbish will be collected in hollows and pollute the water. Particularly in water-power plants, snags or sunken timber and rubbish in front of the mesh screens cause trouble every year. Heretofore, such cleaning has been mainly carried out by divers or cranes. Various scrapers and flutes have also been tried but the methods are slow and expensive as well as require stoppage of the power plant turbines for as long as the cleaning operation takes.

The object of the present invention is to facilitate and speed up the lifting of snags and rubbish from the bottom of waterways and to make it possible to clean the area in front of the mesh screens of water-power plants with the turbines running.

BRIEF DESCRIPTION OF THE DRAWINGS

FIG. 1 is a side elevational view of the suction device of the present invention.

FIG. 2 is a top view of the suction device of the present invention as shown in FIG. 1.

FIG. 6 is an enlarged side elevational view of the load basket as shown in FIGS. 1 and 2.

FIG. 7 is a cross-sectional view of the load basket of FIG. 6.

FIG. 8 is a side elevational view of another embodiment of the suction end of the present invention.

FIG. 9 is an elevational view looking into the inlet opening of the suction end as shown in FIG. 8.

FIG. 10 is a top view of the suction end as shown in FIG. 8.

DETAILED DESCRIPTION OF THE INVENTION

Figure 4:
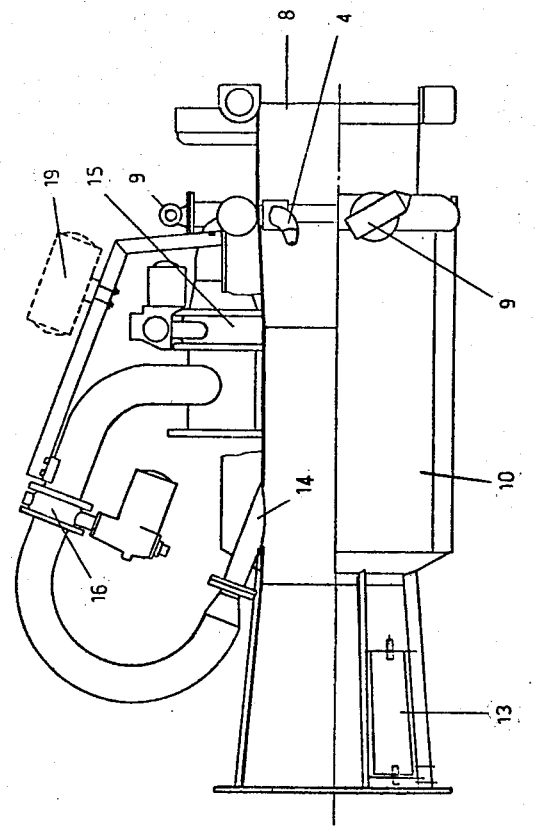
FIG. 4 is an enlarged side elevational view of the suction end of the present invention as shown in FIGS. 1 and 2.

Referring to the Figures, a suction device of the invention operates so that the high-pressure water provided by a pump means 20 aboard a buoyant vessel A, is pumped to nozzles 4 in the suction end B. The nozzles 4, together with said suction end B, provide an ejector (injection pump) and produce a powerful water flow through the suction end. A characteristic feature of the suction device is that the edges of the suction end inlet 8 comprise forced-driven conveyor screws 11 and rollers 12 to turn snags endwise into the suction pipe. The sides have mounted thereon closeable remote-controlled, high-pressure water operated control nozzles 9 extending in four directions. In addition, the body of the suction end B is enveloped by a counterbalance water tank 10 and provided with automatically opening under-pressure flaps 13 as well as with a re-blowing nozzle 14. The water flow provided by the suction end B runs along a pipe 5 articulated to the vessel through an outlet cone 6 into a removable load basket C, wherein water-conveyed timber and rubbish is screened.

The load basket C can be lifted from the water by a crane and opened up in the air like a bucket, with the contents of the basket discharging through the bottom down to the ground or into a vehicle, for example. By this means bottoms of waterways can be cleaned effectively. The load basket can naturally be replaced by other known load handling equipment.

One embodiment of the device of the invention is depicted in the FIGS. 1 to 10. In particular, the suction end B (FIGS. 3 to 5) comprises ejector nozzles 4 as well as remote-controlled closeable control nozzles 9 pointing up, down, left and right. The high-pressure water produced by the pump means 20 effects also in these control nozzles. The control operation takes place by opening a desired control nozzle 9, whereby the discharging high-pressure water produces a reaction force which moves the suction end B in the desired direction. The buoyance of the suction end B is controlled by regulating the amount of water inside the support tank 10.

The entrance side of the suction end B (reference FIG. 3) is conically flared or belled to provide a rectangular inlet opening 8 whose edges have the feed rollers 12 for snags mounted thereon. The horizontally mounted feed rollers (conveyor screws) 11 are provided with a high-pitched spiral ridge so that, with the rollers rotating inwards by means of hydraulic motors 35 or the like, a transverse snag sucked against the roller is forced to turn by the spiral ridges towards the horizontal position on the vertical rollers 12. At least one of the vertical rollers is force-driven and provided with feed teeth, whereby the snag is forced to travel in its longitudinal direction as suction retains the snag tight against the rollers. When the snag end reaches beyond one of the vertical rollers, even a tall snag is turned by suction so that it is forced endwise into the suction pipe via the suction end B. The suction end is also provided with under-pressure flaps 13 which open automatically and bring water from outside into the suction pipe 5 as a result of sudden blocking of the suction end.

For clearing of blockage of the suction end, the suction end B also comprises a blow nozzle 14 wherethrough, by means of valves 15 and 16, all water produced by the high-pressure pump can be injected against the normal direction. The equipment of the suction end also includes illuminators 18 and a television camera 19.

Besides the hull, the vessel A comprises a water pump 20, hydraulic pumps and air compressor as well as electric generators. The steering of the vessel is accomplished by four winches 21 whose steel cables 22 are anchored in various directions. By these cables the vessel can be moved in all quarter directions on the surface of water.

The air produced by the pneumatic compressor provides the regulation of the amount of water in the counter-balance tank in the suction end as well as that in the counter-balance tanks in the hull of the vessel.

The power of the electric generator is used to operate the television camera, the illuminators of the suction end B and the monitor in the wheelhouse.

The water pump 20 sucks the water directly through the vessel's bottom via an extensive bottom screen and pumps the water along a rubber hose 23, into a pressure pipe 24, upon the suction pipe, and to the suction end B.

The aft of the vessel is provided with hinge lugs for the attachment of the suction pipe 5. The suction pipe is pivotable on the lugs in the up and down directions relative to the vessel, but when the suction pipe turns sideways, the vessel is forced to turn along.

The aft of the vessel is further provided with locking means for the attachment of the load basket C. The load basket (FIGS. 6 and 7) consists of a two-section frame made of aluminium alloy pipes which frame supports a strong aluminium alloy grid or net mounted thereon. Both halves of the basket are connected to each other by pivot pins 25 in such a way that the basket is capable of opening like a bucket. The inner half 26 of the basket is capable of pivoting into the outer half 27, whereby the basket can be transported from one location to another by conventional vehicles.

After it is filled up, the load basket is lifted from the water by a double-hooked crane by means of a lifting beam 28 and ropes so that the first lifting operation is done with the upper hook by a ring 29 to keep the basket closed, since the actual lifting is done by gripping the lugs 30 on the center line of the basket.

When unloading, the lower hook of the crane is used to lift the unit by a ring 31, the lifting beam 28 thus rising and the opening ropes 32, which run over the beam's ends, pulling the corners of the load basket up, whereby the halves of the basket pivot around the pivot pins 25 and the lower edges of the halves separate from each other. The load discharges down through the gap thus formed.

Figure 5:
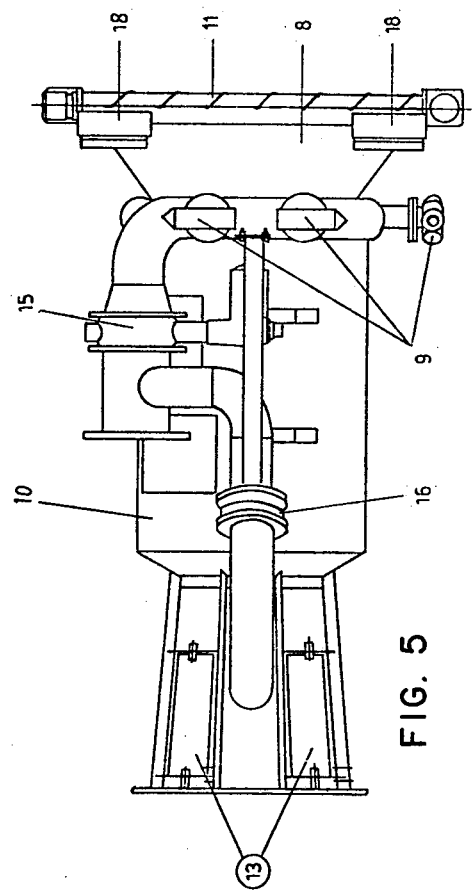
FIG. 5 is an enlarged top view of the suction end of the present invention as shown in FIGS. 1 and 2.
Figure 3:
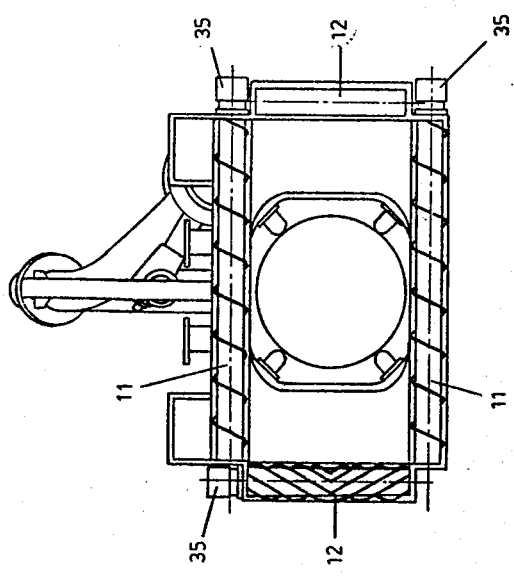
FIG. 3 is an enlarged elevational view looking into the inlet opening of the suction end of the suction device as shown in FIGS. 1 and 2.

Furthermore, the load basket is provided with locking latches 33 preventing the basket from opening in the water. Steel cables 34 extend from pivotable lifting lugs 30 to said locking latches 33 so that, with the lifting lugs 30 pivoting upright during the lifting operation of the basket, the steel cables 34 pull the locking latches open right in the beginning of the lift to make the opening of the load basket in the air possible. FIGS. 8 to 10 show another embodiment of the suction end of the present invention. Suction device according to the Finnish patent application No. 763178. The horizontal conveyor screws 11 of the suction end according to FIGS. 3 to 5 are replaced by a forward directed, triangular flange 17 mounted on the upper edge or optionally on both upper and lower edge of the suction opening 8. The sloping front edge of the flange tips the snags approaching in the vertical position over the conveyor rollers 12. To the edge of the suction end inlet opening 8 is suitably secured a hook-like means 37 designed for mechanical ripping of a snag jam, the tip of hook-like means 37 can be provided with a pressure-water nozzle 36 directed at the suction end inlet opening 8. The triangular flange 17 and the hook 37 secured thereto are mounted on the inlet of the suction end by means of a horizontal hinge 38, whereby the change of angle of the means relative to the suction end is possible.

I claim:

1. In a suction device for cleaning debris from waterways including a pump means aboard a vessel for producing a high-pressure water flow, a suction end for sucking therein debris found in waterways, said suction end having an inlet opening, wherein the improvement comprises:

force-driven conveyor screws and roller means mounted along the edges of said suction end inlet opening adapted for turning snagged material in waterways endwise into a suction pipe terminating at said inlet opening, remote-controlled, high pressure water operated, closeable control nozzles mounted on said suction end, said control nozzles being adapted to receive water flow from said pump, said water flowing from said control nozzles generating a force upon said suction end to thereby provide predetermined movement of said suction end by the selective passage of high pressure water through one or more of said control nozzles, said suction end having a counterbalance water tank for controlling the buoyance of said suction end by regulating the amount of water in said tank, underpressure flaps being mounted on said suction end adapted to open and permit water to enter said suction pipe upon the blockage of said inlet opening, a blow nozzle provided at said suction end for clearing a blockage at said inlet opening, said suction end being pivotably mounted to said vessel, and a load basket in communication with the end of said suction pipe opposite said suction end, said load basket adapted for depositing therein material sucked through said suction pipe from said suction end, said load basket adapted to be lifted from water by a lifting means.

2. The suction device in accordance with claim 1, wherein said conveyor screws are disposed along the horizontal edges of said suction end inlet opening and said rollers are disposed along the vertical edges of said inlet opening.

3. The suction device in accordance with claim 1, wherein said material sucked into said suction end is timber snagged at the bottom of a waterway.

4. The suction device in accordance with claim 1, wherein said load basket is further adapted for unloading through the bottom of said basket.

5. The suction device in accordance with claim 1, wherein said control nozzles are mounted on said suction end in a number sufficient to provide upward, downward, and side to side movement of said suction end.

6. In a suction device for cleaning debris from waterways including a pump means aboard a vessel for producing a high-pressure water flow, a suction end for sucking therein debris found in waterways, said suction end having an inlet opening, wherein the improvement comprises:

a forward directed, triangular flange mounted on at least one of the horizontal edges of said suction end inlet opening and roller means mounted on said vertical edges, said triangular flange having a sloping front edge for tipping debris vertically approaching said suction end over onto said roller means and endwise into a suction pipe terminating at said inlet opening, remote-controlled, high-pressure water operated, closeable control nozzles mounted on said suction end, said control nozzles being adapted to receive water flow from said pump, said water flowing from said control nozzles generating a force upon said suction end to thereby provide pre etermined movement of said suction end by the selective passage of high pressure water through one or more of said control nozzles, said suction end having a counter-balance water tank for controlling the buoyance of said suction end by regulating the amount of water in said tank, underpressure flaps being mounted on said suction end adapted to open and permit water to enter said suction pipe upon the blockage of said inlet opening, a blow nozzle provided at said suction end for clearing a blockage at said inlet opening, said suction end being pivotably mounted to said vessel, and a load basket in communication with the end of said suction pipe opposite said suction end, said load basket adapted for depositing therein material sucked through said suction pipe from said suction end, said load basket adapted to be lifted from water by a lifting means.

7. The suction device in accordance with claim 6, wherein said triangular flanges are mounted on both of said upper and lower horizontal edges.

8. The suction device in accordance with claim 6, wherein a hook-like means is secured to said triangular flange, said hook-like means constructed for mechanical ripping of a snag jam, the tip of said means provided with a pressure-water nozzle directed at the suction end inlet opening.

9. The suction device in accordance with claim 8, wherein said triangular flange and the hook like means are mounted on the inlet of the suction end by means of a horizontal hinge, so that the change of angle of said means relative to the suction end is possible.

* * * * *